United States Patent
Hirai (10) Patent No.: US 7,426,368 B2
(45) Date of Patent: Sep. 16, 2008

(54) SATELLITE BROADCASTING CONVERTER, CONTROL CIRCUIT INCORPORATED THEREIN, AND DETECTOR CIRCUIT USED IN SUCH CONTROL CIRCUIT

(75) Inventor: Masato Hirai, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 614 days.

(21) Appl. No.: 11/174,739

(22) Filed: Jul. 6, 2005

(65) Prior Publication Data
US 2006/0009151 A1    Jan. 12, 2006

(30) Foreign Application Priority Data
Jul. 7, 2004    (JP)    ............... 2004-201086

(51) Int. Cl.
*H04H 20/74*    (2008.01)
(52) U.S. Cl. .................. 455/3.02; 455/188.1; 348/735; 324/76.41
(58) Field of Classification Search .............. 455/3.02
See application file for complete search history.

(56) References Cited

U.S. PATENT DOCUMENTS

| | | | | |
|---|---|---|---|---|
| 4,249,259 A | * | 2/1981 | Oda et al. ............ | 455/182.3 |
| 4,259,734 A | * | 3/1981 | Harmel ............... | 367/101 |
| 4,264,976 A | * | 4/1981 | Yamashita ........... | 455/161.2 |
| 4,406,018 A | * | 9/1983 | Motohashi ........... | 455/164.1 |
| 4,547,777 A | * | 10/1985 | Lamiraux ............ | 342/394 |
| 4,608,710 A | * | 8/1986 | Sugiura ............... | 725/68 |
| 4,734,638 A | * | 3/1988 | Weber ................. | 324/66 |
| 4,823,135 A | * | 4/1989 | Hirashima et al. ...... | 342/362 |
| 5,014,350 A | * | 5/1991 | Nezu .................. | 455/258 |
| 5,036,334 A | * | 7/1991 | Henderson et al. ...... | 342/460 |
| 5,053,782 A | * | 10/1991 | Levinberg et al. ....... | 342/352 |
| 5,107,335 A | * | 4/1992 | Nishiyama et al. ...... | 348/735 |
| 5,206,954 A | * | 4/1993 | Inoue et al. ........... | 725/69 |

(Continued)

FOREIGN PATENT DOCUMENTS

JP    4-135328    5/1992

(Continued)

OTHER PUBLICATIONS

Copending U.S. Appl. No. 11/043,152 filed on Jan. 27, 2005.

(Continued)

*Primary Examiner*—Matthew Anderson
*Assistant Examiner*—Hai V Nguyen
(74) *Attorney, Agent, or Firm*—McGinn IP Law Group PLLC (57) ABSTRACT

In a broadcasting satellite converter adapted to be connected to a BS tuner and fed with a power supply voltage signal from the broadcasting satellite tuner, a receiver circuit includes a mixer, and a plurality of local oscillators connected to the mixer to convert broadcasting satellite signals into intermediate frequency signals. The receiver circuit is controlled by a control circuit including a detector circuit and a selector circuit. The detector circuit detects whether a band switching pulse signal is superimposed on the pulse signal, and has a period counting circuit that produces numerical count data representing a period of a frequency of the band switching pulse signal. The selector circuit selectively drives one of the local oscillators in accordance with the numerical count data obtained in the detector circuit.

21 Claims, 7 Drawing Sheets

U.S. PATENT DOCUMENTS

| | | | | |
|---|---|---|---|---|
| 5,276,714 | A * | 1/1994 | Hori et al. | 375/368 |
| 5,345,591 | A * | 9/1994 | Tsurumaki et al. | 725/69 |
| 5,519,405 | A * | 5/1996 | Matsubara et al. | 342/359 |
| 5,649,311 | A * | 7/1997 | Somei | 455/188.1 |
| 5,649,318 | A * | 7/1997 | Lusignan | 725/70 |
| 5,940,737 | A * | 8/1999 | Eastman | 725/68 |
| 6,009,304 | A * | 12/1999 | Kato | 725/68 |
| 6,157,229 | A * | 12/2000 | Yoshikawa | 327/149 |
| 6,282,293 | B1 * | 8/2001 | Itoh et al. | 380/233 |
| 6,490,010 | B1 * | 12/2002 | Shibuya et al. | 348/735 |
| 6,710,814 | B1 * | 3/2004 | Ueno et al. | 348/500 |
| 6,957,039 | B2 * | 10/2005 | Imai | 455/3.02 |
| 7,142,808 | B2 * | 11/2006 | Atarashi | 455/3.02 |
| 7,245,872 | B2 * | 7/2007 | Hirai | 455/3.02 |
| 7,298,130 | B2 * | 11/2007 | Komatsu et al. | 324/76.41 |
| 2002/0047729 | A1 * | 4/2002 | Hirata et al. | 327/50 |
| 2002/0172196 | A1 * | 11/2002 | Komatsu et al. | 370/366 |
| 2003/0206632 | A1 * | 11/2003 | Itoh et al. | 380/231 |
| 2003/0228131 | A1 * | 12/2003 | Miyazawa | 386/46 |
| 2004/0075771 | A1 * | 4/2004 | Miyabayashi | 348/570 |

FOREIGN PATENT DOCUMENTS

| | | |
|---|---|---|
| JP | 8-293812 | 11/1996 |
| JP | 2000-244289 | 9/2000 |
| JP | 2003-50651 | 2/2003 |
| JP | 2003-194860 | 7/2003 |

OTHER PUBLICATIONS

Copending of U.S. Appl. No. 11/139,560 filed on May 31, 2005.
Japanese Office Action dated Aug. 30, 2006, with partial English translation.
Copending U.S. Appl. No. 11/139,560 to Masato Hirai filed on May 31, 2005.
Copending U.S. Appl. No. 11/1043,152 to Masato Hirai filed on Jan. 27, 2005.

* cited by examiner

SATELLITE BROADCASTING CONVERTER, CONTROL CIRCUIT INCORPORATED THEREIN, AND DETECTOR CIRCUIT USED IN SUCH CONTROL CIRCUIT

BACKGROUND OF THE INVENTION

1. Field of the Invention

The present invention relates to a converter, called a broadcasting satellite (BS) converter in this field, which is used to receive BS signals in a satellite broadcasting system, and more particularly relates to an improvement of a control circuit incorporated in the BS converter to select either a high frequency band or a low frequency band included in a reception frequency band used in the satellite broadcasting system.

2. Description of the Related Art

A reception system of a satellite broadcasting system includes a low noise down converter block (LNB) provided in a parabola antenna, and a set top box (STB) connected to the LNB through the intermediary of a coaxial cable. In this specification, the LNB will be referred to as a broadcasting satellite (BS) converter, and the STB will be referred to as a broadcasting satellite (BS) tuner.

In recent years, a reception frequency band used in a satellite broadcasting system has been widened to accommodate digitization of the satellite broadcasting system and an increase in the number of channels thereof. For example, the widened reception frequency band is defined as one between 10.7 GHz and 12.75 GHz, and it is impossible to receive all broadcasting satellite (BS) signals (microwaves), included in the widened reception frequency band, with only one parabola antenna and one BS converter. In other words, it is necessary to prepare two parabola antennas and two BS converters before all the BS signals can be received and processed. Namely, the reception frequency band is divided into a low frequency band of 10.7 GHz to 11.7 GHz and a high frequency band of 11.7 GHz to 12.75 GHz, and the two parabola antennas and two BS converters are arranged for receiving and processing the respective low and high frequency bands.

JP-A-H08-293812, corresponding to U.S. Pat. No. 5,649,311, discloses a prior art BS converter which is constituted so as to receive and process all the BS signals included in the reception frequency band. Namely, according to JP-A-H08-293812, it is possible to receive and process all the BS signals with a single parabola antenna and BS converter.

This prior art BS converter is provided with a reception circuit for receiving and processing all the BS signals, and a control circuit for controlling the reception circuit. The reception circuit includes a mixer, and first and second local oscillators connected to the mixer. The first local oscillator inputs a first local frequency signal to the mixer, and the second local oscillator inputs a second local frequency signal to the mixer. The first local frequency signal features a lower frequency than that of the second local frequency signal. The control circuit selects which local oscillator should be driven.

In particular, when a television set, which is connected to the BS converter through the intermediary of the BS tuner and the coaxial cable, is tuned to a channel to receive a BS signal included in the low frequency band of 10.7 GHz to 11.7 GHz, only the first local oscillator is driven by the control circuit so that the BS signals included in the low frequency band of 10.7 GHz to 11.7 GHz are converted into intermediate frequency signals featuring a frequency of 950 MHz to 2150 MHz.

On the other hand, when the television set is tuned to a channel to receive a BS signal included in the high frequency band of 11.7 GHz to 12.75 GHz, only the second local oscillator is driven by the control circuit so that the BS signals included in the high frequency band of 11.7 GHz to 12.75 GHz are converted into intermediate frequency signals featuring a frequency of 950 MHz to 2150 MHz.

Thus, by using the prior art BS converter, it is possible to receive and process all the BS signals by the single parabola antenna and BS converter. Nevertheless, the prior art BS converter is not satisfactory in that it is impossible to obtain reliable operation.

In particular, when the television set is tuned to a channel to receive a BS signal included in the high frequency band of 11.7 GHz to 12.75 GHz, a band switching pulse signal featuring a duty factor of 50% is superimposed on a power supply voltage signal which is fed from the BS tuner to the BS converter through the coaxial cable. The control circuit includes a detector circuit for detecting whether the band switching pulse signal is superimposed on the power supply voltage signal, and a selector circuit for selectively driving the second local oscillator when the band switching pulse signal is detected by the detector circuit.

However, in this prior art, the detector circuit is susceptible to large amplitude noise, such as a spike noise or the like. As a result, a malfunction of the detector circuit may occur. Namely, the control circuit may mistakenly select which local oscillator should be driven, as explained in detail hereinafter.

Also, in the above-mentioned prior art, a band switching time, which is defined as a period of time measured from a time at which the television set is tuned to a channel to receive a BS signal included in the high frequency band to a time at which a picture is displayed on a screen of the television set based on the tuned channel, is relatively long. Namely, it takes a relatively long time to detect the band switching pulse signal by the detector circuit, as explained in detail hereinafter.

SUMMARY OF THE INVENTION

Therefore, an object of the present invention is to provide a broadcasting satellite (BS) converter used to receive and process BS signals in a satellite broadcasting system, which is constituted such that it is possible to obtain a satisfactorily reliable operation.

Another object of the present invention is to provide such a BS converter featuring a detector circuit which is constituted such that it is possible to rapidly detect superimposition of a band switching pulse signal on a power supply voltage signal.

Another object of the present invention is to provide a control circuit that controls a receiver circuit included in such a BS converter.

Yet another object of the present invention is to provide a detector circuit used in such a control circuit, which is not susceptible to various noises.

In accordance with a first aspect of the present invention, there is provided a broadcasting satellite (BS) converter adapted to be connected to a broadcasting satellite tuner and fed with a pulse signal from the broadcasting satellite tuner. The BS converter comprises a receiver circuit including a mixer, and a plurality of local oscillators connected to the mixer to convert broadcasting satellite signals into intermediate frequency signals, and a control circuit that controls the receiver circuit. The control circuit includes a detector circuit that detects whether a band switching pulse signal is superimposed on the pulse signal. The detector circuit includes a period counting circuit that produces numerical count data representing a period of a frequency of the band switching pulse signal. The control circuit further includes a selector circuit that selectively drives one of the local oscillators in accordance with the numerical count data obtained in the detector circuit.

In accordance with a second aspect of the present invention, there is provided a control circuit that controls a plurality of local oscillators, included in a receiver circuit of a broadcasting satellite converter, with a band switching pulse signal superimposed on a pulse signal fed from a broadcasting satellite tuner to the receiver circuit. The control circuit comprises a detector circuit that detects whether the band switching pulse signal is superimposed on the pulse signal, and the detector circuit includes a period counting circuit that produces numerical count data representing a period of a frequency of the band switching pulse signal. The control circuit further includes a selector circuit that selectively drives one of the local oscillators in accordance with the numerical count data obtained in the detector circuit.

In accordance with a third aspect of the present invention, there is provided a detector circuit that detects whether a band switching pulse signal is superimposed on a pulse signal fed from a broadcasting satellite tuner to a receiver circuit of a broadcasting satellite converter. The detector circuit comprises a period counting circuit that produces numerical count data representing a period of a frequency of the band switching pulse signal.

The period counting circuit may include an oscillator that outputs a series of clock pulses having a higher frequency than that of the band switching pulse signal, and a counter that counts the clock pulses output from the oscillator during the period of the frequency of the band switching pulse signal for the production of the numerical count data. In this case, the period counting circuit may further include a reset circuit that resets the counter when the counting of the clock pulses during the period of the frequency of the band switching pulse signal is completed.

On the other hand, the period counting circuit may include an oscillator that outputs a series of clock pulses having a higher frequency than that of the band switching pulse signal, a first counter that counts the clock pulses output from the oscillator during a first level duration of the band switching pulse signal to thereby produce a first piece of numerical count data representing the first level duration of the band switching pulse signal, and a second counter that counts the clock pulses output from the oscillator during a second level duration of the band switching pulse signal to thereby produce a second piece of numerical count data representing the second level duration of the band switching pulse signal, with the first and second pieces of numerical count data forming the numerical count data. In this case, the period counting circuit may further include a first reset circuit that resets the first counter when the counting of the clock pulses during the first level duration of the band switching pulse signal is completed, and a second reset circuit that resets the second counter when the counting of the clock pulses during the second level duration of the band switching pulse signal is completed.

The detector circuit may further comprise a high pass filter that is constituted such that the band switching pulse signal is allowed to pass therethrough, and a level detector circuit that detects a peak voltage of the band switching pulse signal so as to wave-shape the band switching pulse signal, the production of the numerical count data being carried out based on the wave-shaped band switching pulse signal. Preferably, the level detector circuit includes a comparator featuring a hysteresis characteristic for the wave-shaping of the band switching pulse signal.

The detector circuit may further comprise a frequency determination circuit that determines whether the numerical count data is derived from the frequency of the band switching pulse signal. The frequency determination circuit may be formed as either a logic matrix circuit or a window-type digital comparator circuit.

BRIEF DESCRIPTION OF THE DRAWINGS

The above objects and other objects will be more clearly understood from the description set forth below, with reference to the accompanying drawings, wherein.

DESCRIPTION OF THE PREFERRED EMBODIMENTS

Before description of an embodiment of the present invention, for better understanding of the present invention, a prior art broadcasting satellite (BS) converter, as disclosed in JP-A-H08-293812, will be now explained with reference to FIGS. 1 and 2.

This prior art BS converter, generally indicated by reference 10, is provided with a feed horn 12 associated with an exterior parabola antenna (not shown), and is connected to an interior broadcasting satellite (BS) tuner 14 through a coaxial cable 16.

The BS converter 10 comprises a power source circuit 18, a receiver circuit 20, a control circuit 22, and a selector circuit 24. In operation, a power supply voltage signal is fed from the BS tuner 14 to the BS converter 10 through the coaxial cable 16, and is input to the power source circuit 18 and the selector circuit 24. Although the power supply voltage signal is switched between a low voltage (e.g. 13 volts) and a high voltage (e.g. 18 volts) for the reasons stated in detail hereinafter, the power source circuit 18 always generates a constant power supply voltage (e.g. 4 volts) for operating the receiver circuit 20, the control circuit 22, and the selector circuit 24.

Figure 1:
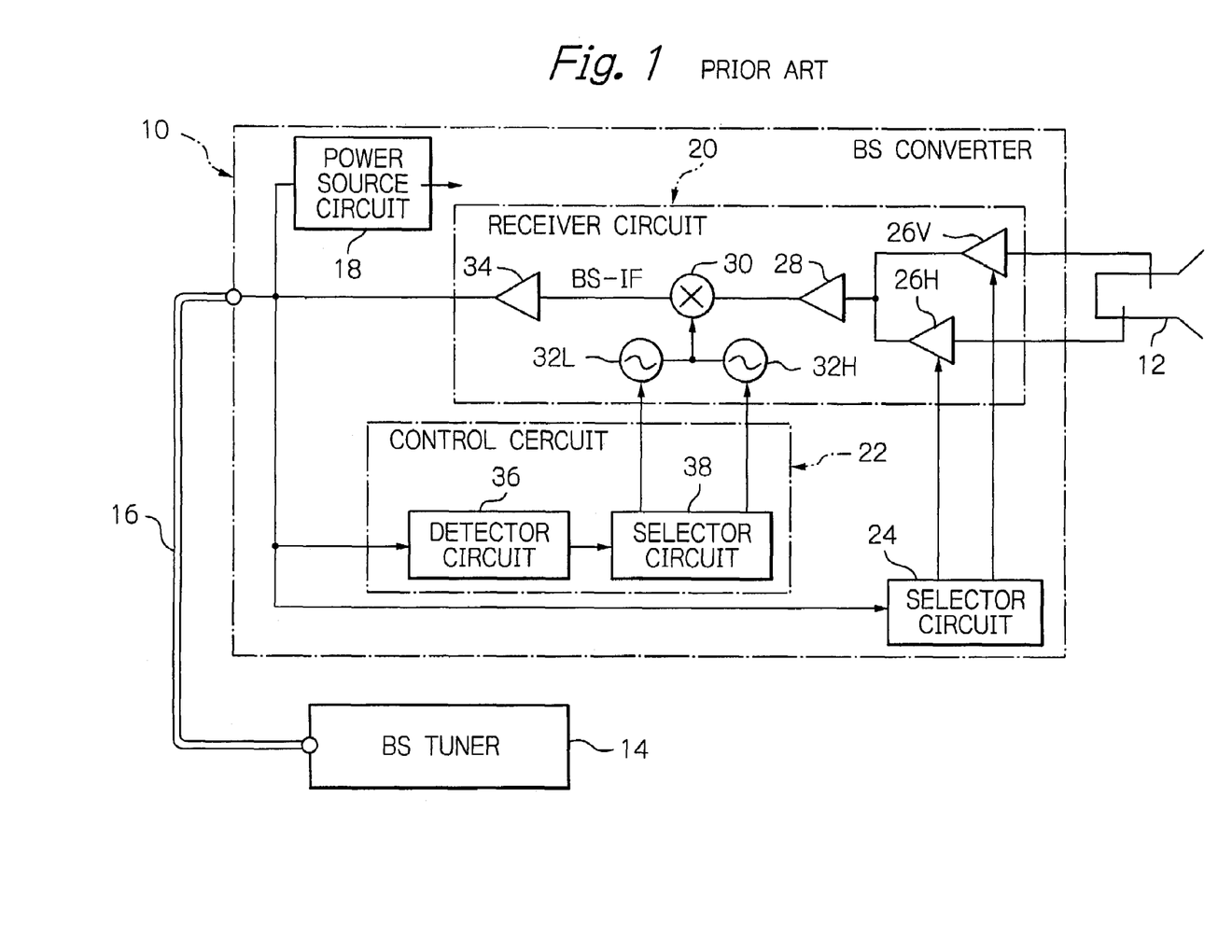
FIG. 1 is a block diagram of a prior art broadcasting satellite converter.

As shown in FIG. 1, the receiver circuit 20 includes a set of first and second primary amplifiers 26V and 26H, a secondary amplifier 28, a mixer 30, a set of first and second local oscillators 32L and 32H, and an amplifier 34.

Broadcasting satellite (BS) signals (microwaves), which are transmitted from a satellite, are converged on the feed horn 12 by the parabola antenna, and each of the BS signals is separated into a vertically polarized wave and a horizontally polarized wave. The vertically-polarized waves are fed to the first primary amplifier 26V, and are amplified and output to the secondary amplifier 28 as BS signals featuring the vertical polarization. On the other hand, the horizontally-polarized waves are fed to the second primary amplifier 26H, and are amplified and output to the secondary amplifier 28 as BS signals featuring the horizontal polarization. Note, as already stated above, the BS signals are included in a widened reception frequency band which is defined as one between 10.7 GHz and 12.75 GHz.

In operation, only one of the first and second primary amplifiers 26V and 26H is driven, and the selector circuit 24 selects which primary amplifier 26V or 26H should be driven.

In particular, for example, while a television set (not shown), connected to the BS tuner 14, is tuned to a channel to receive a BS signal featuring the vertical polarization, the power supply voltage signal, input to the selector switch 24, is switched from the high voltage (18 volts) to the low voltage (13 volts). At this time, a first drive control signal, which is output from the selector circuit 24 to the first primary amplifier 26V, is maintained at a high level so that the first primary amplifier 26V is driven. On the other hand, a second drive control signal, which is output from the selector circuit 24 to the second primary amplifier 26H, is maintained at a low level so that the second primary amplifier 26H is not driven. Namely, when the power supply voltage signal is switched from the high voltage (18 volts) to the low voltage (13 volts), only the first primary amplifier 26V is driven by the selector circuit 24.

When the television set, connected to the BS tuner 14, is tuned to a channel to receive a BS signal featuring the horizontal polarization, the power supply voltage signal, input to the selector switch 24, is switched from the low voltage (13 volts) to the high voltage (18 volts). At this time, the first drive control signal, which is output from the selector circuit 24 to the first primary amplifier 26V, is changed from the high level to a low level so that the driving of the first primary amplifier 26V is stopped. On the other hand, the second drive control signal, which is output from the selector circuit 24 to the second primary amplifier 26H, is changed from the low level to a high level so that the second primary amplifier 16H is driven. Namely, when the power supply voltage is switched from the low voltage (13 volts) to the high voltage (18 volts), only the second primary amplifier 26H is driven the selector circuit 24.

In short, the power supply voltage signal, which is switched between the low voltage (13 volts) and the high voltage (18 volts), serves as a pulse signal for selecting which primary amplifier 26V or 26H should be driven.

Either the BS signals featuring the vertical polarization or the BS signals featuring the horizontal polarization are fed to the secondary amplifier 28, and then the amplified BS signals are fed to the mixer 20 in which the BS signals are mixed with one of a first local frequency signal and a second local frequency signal which are output from the respective first and second local oscillators 32L and 32H. The first local frequency signal has a lower frequency than that of the second local frequency signal. When the BS signals are mixed with the first local frequency signal output from the first local oscillator 32L, a part of the BS signals, which are included in a low frequency band of 10.7 GHz to 11.7 GHz, are converted into intermediate frequency signals BS-IF (FIG. 1). When the BS signals are mixed with the second local frequency signal output from the second local oscillator 32H, the remaining part of the BS signals, which are included in a high frequency band of 11.7 GHz to 12.75 GHz, are converted into intermediate frequency signals BS-IF (FIG. 1).

In either event, the intermediate frequency signals BS-IF are fed from the mixer 10 to the amplifier 34, and the amplified intermediate frequency signals BS-IF are fed to the BS tuner 14 through the coaxial cable 16. Note, for example, the intermediate frequency signals BS-IF have a frequency of 1 GHz.

The control circuit 22 selects which local oscillator 32L or 32H should be driven. As shown in FIG. 1, the control circuit 22 includes a detector circuit 36 for detecting whether a band switching pulse signal is superimposed on the power supply voltage signal (13 volts or 18 volts), and a selector circuit 38 for selecting which local amplifier 32L or 32H should be driven on the basis of a detection result obtained in the detector circuit 36. Note, the band switching pulse signal is defined as a tone signal having a frequency of 22±4 kHz.

In particular, when the television set, connected to the BS tuner 14, is tuned to a channel to receive a BS signal included in the low frequency band of 10.7 GHz to 11.7 GHz, the band switching pulse signal is not superimposed on the power supply voltage signal (13 volts or 18 volts) in the BS tuner 14, and thus the band switching pulse signal cannot be detected by the detector circuit 36. At this time, a first drive control signal, which is output from the selector circuit 38 to the first local frequency oscillator 32L, is maintained at a high level so that the first local frequency oscillator 32L is driven. On the other hand, a second drive control signal, which is output from the selector circuit 38 to the second local frequency oscillator 32H, is maintained at a low level so that the second local frequency oscillator 32H is not driven.

In short, while the band switching pulse signal is not superimposed on the power supply voltage signal (13 volts or 18 volts), only the first local frequency oscillator 32L is driven so that the BS signals, included in the low frequency band of 10.7 GHz to 11.7 GHz, are converted into the intermediate frequency signals BS-IF.

When the television set, connected to the BS tuner 14, is tuned to a channel to receive a BS signal included in the high frequency band of 11.7 GHz to 12.75 GHz, the band switching pulse signal is superimposed on the power supply voltage signal (13 volts or 18 volts) in the BS tuner 14, and thus the band switching pulse signal can be detected by the detector circuit 36. At this time, the first drive control signal, which is output from the selector circuit 38 to the first local frequency oscillator 32L, is changed from the high level to a low level so that the driving of the first local frequency oscillator 32L is stopped. On the other hand, the second drive control signal, which is output from the selector circuit 38 to the second local frequency oscillator 32H, is changed from the low level to a high level so that the second local frequency oscillator 32H is driven.

In short, while the band switching pulse signal is superimposed on the power supply voltage signal (13 volts or 18 volts), only the second local frequency oscillator 32H is driven so that the BS signals, included in the high frequency band of 11.7 GHz to 12.75 GHz, are converted into the intermediate frequency signals BS-IF.

Figure 2:
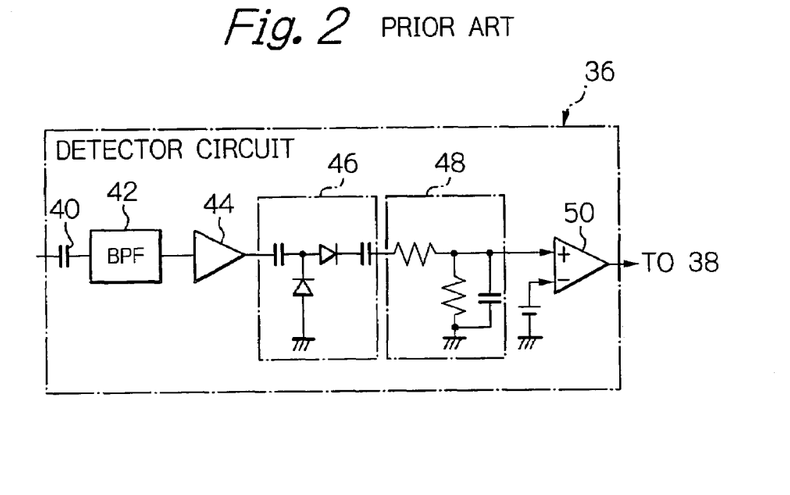
FIG. 2 is a circuit diagram of a prior art detector circuit used in the prior art broadcasting satellite converter shown in FIG. 1.

FIG. 2 shows a circuit diagram of the detector circuit 36. As shown in this drawing, the detector circuit 36 includes a capacitor 40, a band pass filter 42, an amplifier 44, a rectifier circuit 46, an integrating circuit or low pass filter 48, and a comparator 50.

For example, when the band switching pulse signal having the frequency of 22±4 kHz is superimposed on the power supply voltage signal (13 volts or 18 volts) in the BS tuner 14 by tuning the television set to a channel to receive a BS signal included in the high frequency band of 11.7 GHz to 12.75 GHz, the band switching pulse signal is input together with the intermediate frequency signals BS-IF to the band pass filter 42 through the capacitor 40, but only the band switching pulse signal is allowed to pass through the band pass filter 42. Then, the band switching pulse signal is input to the amplifier 44 so as to be amplified to a given voltage level.

The amplified band switching pulse signal is rectified by the rectifier circuit 46, and then an amplitude of the rectified band switching pulse signal is detected by the low pass filter 48. Namely, both the rectifier circuit 46 and the low pass filter 48 function as an amplitude detector for detecting the amplitude of the band switching pulse signal, so that the detected amplitude is output as an amplitude voltage signal from the low pass filter 48 to the comparator 50.

In the comparator 50, the amplitude voltage signal is compared with a predetermined reference voltage. The amplitude voltage signal, derived from the band switching pulse signal, is higher than the reference voltage of the comparator 50, so that a high level signal is output from the comparator 50 to the selector circuit 38. At this time, the drive control signal, which is output from the selector circuit 38 to the second local oscillator 32H, is changed from the low level to the high level, whereas the drive control signal, which is output from the selector circuit 38 to the first local oscillator 32L, is changed from the high level to the low level.

Thus, as stated above, only the second local oscillator 32H is driven so that the conversion of the BS signals, included in the high frequency band of 11.7 GHz to 12.75 GHz, into the intermediate frequency signals BS-IF is carried out.

Of course, when the band switching pulse signal having the frequency of 22±4 kHz is not superimposed on the power supply voltage signal (13 volts or 18 volts), i.e. when the television set is tuned to a channel to receive a BS signal included in the low frequency band of 10.7 GHz to 11.7 GHz, the amplitude voltage signal, which is output from the low pass filter 48, is lower than the reference voltage of the comparator 50, so that a low level signal is output from the comparator 50 to the selector circuit 38. At this time, the drive control signal, which is output from the selector circuit 38 to the first local oscillator 32L, is changed from the low level to the high level, whereas the drive control signal, which is output from the selector circuit 38 to the second local oscillator 32H, is changed from the high level to the low level.

Thus, as stated above, only the first local oscillator 32L is driven so that the conversion of the BS signals, included in the low frequency band of 10.7 GHz to 11.7 GHz, into the intermediate frequency signals BS-IF is carried out.

Figures 3A, 3B:
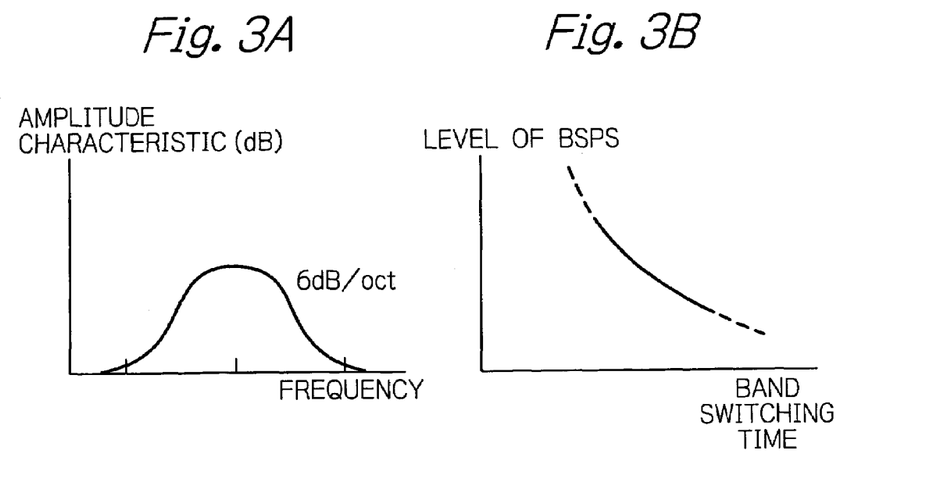
FIG. 3A is a graph showing a frequency/amplitude characteristic of a band pass filter used in the prior art detector circuit shown in FIG. 2.
FIG. 3B is a graph showing a band switching time characteristic of the prior art detector circuit shown in FIG. 2.

In this prior art, the band pass filter 42 may have a frequency/amplitude characteristic as shown in a graph of FIG. 3A. As is apparent from this graph, each of the side bands of the amplitude characteristic features a gradual slope, and thus the detector circuit 36 is susceptible to a noise having a large amplitude, such as a spike noise or the like, which is generated when the power supply voltage signal is switched between the low voltage (e.g. 13 volts) and the high voltage (e.g. 18 volts) or which is generated from internal combustion engines of motorcycles or automobiles. Of course, when the spike noise is introduced in the detector circuit 36, a malfunction of the detector circuit 36 may occur. Namely, the control circuit 22 may mistakenly select which local oscillator 32L or 32H should be driven.

Also, in addition to the side bands of the amplitude characteristic featuring the gradual slope, since the band switching pulse signal has a small peak value of 0.6±0.2 volts, a sensitivity of the detector circuit 36 for detecting the band switching pulse signal (22±4 kHz) is inferior.

In short, in the prior art BS converter, it is impossible to obtain a satisfactorily reliable operation of the BS converter 10.

Note, in the above-mentioned prior art BS converter 10, although a low pass filter may be substituted for the band pass filter 42, the low pass filter is also susceptible to a noise having a large amplitude, such a spike noise or the like.

Also, in the above-mentioned prior art, as shown in a graph of FIG. 3B, the detector circuit 36 may have a band switching time characteristic with respect to a level of the band switching pulse signal (BSPS) output from the rectifier circuit 46. As stated hereinbefore, the band switching time is defined as a period of time measured from a time at which the television set is tuned to a channel to receive a BS signal included in the high frequency band to a time at which a picture is displayed on a screen of the television set based on the tuned channel. As is apparent from the graph of FIG. 3B, the smaller the level of the band switching pulse signal, the longer the band switching time. In short, it takes a relatively long time to detect the band switching pulse signal by the prior art detector circuit 36.

First Embodiment

Next, with reference to FIG. 4, a first embodiment of a broadcasting satellite (BS) converter according to the present invention is explained below.

Figure 4:
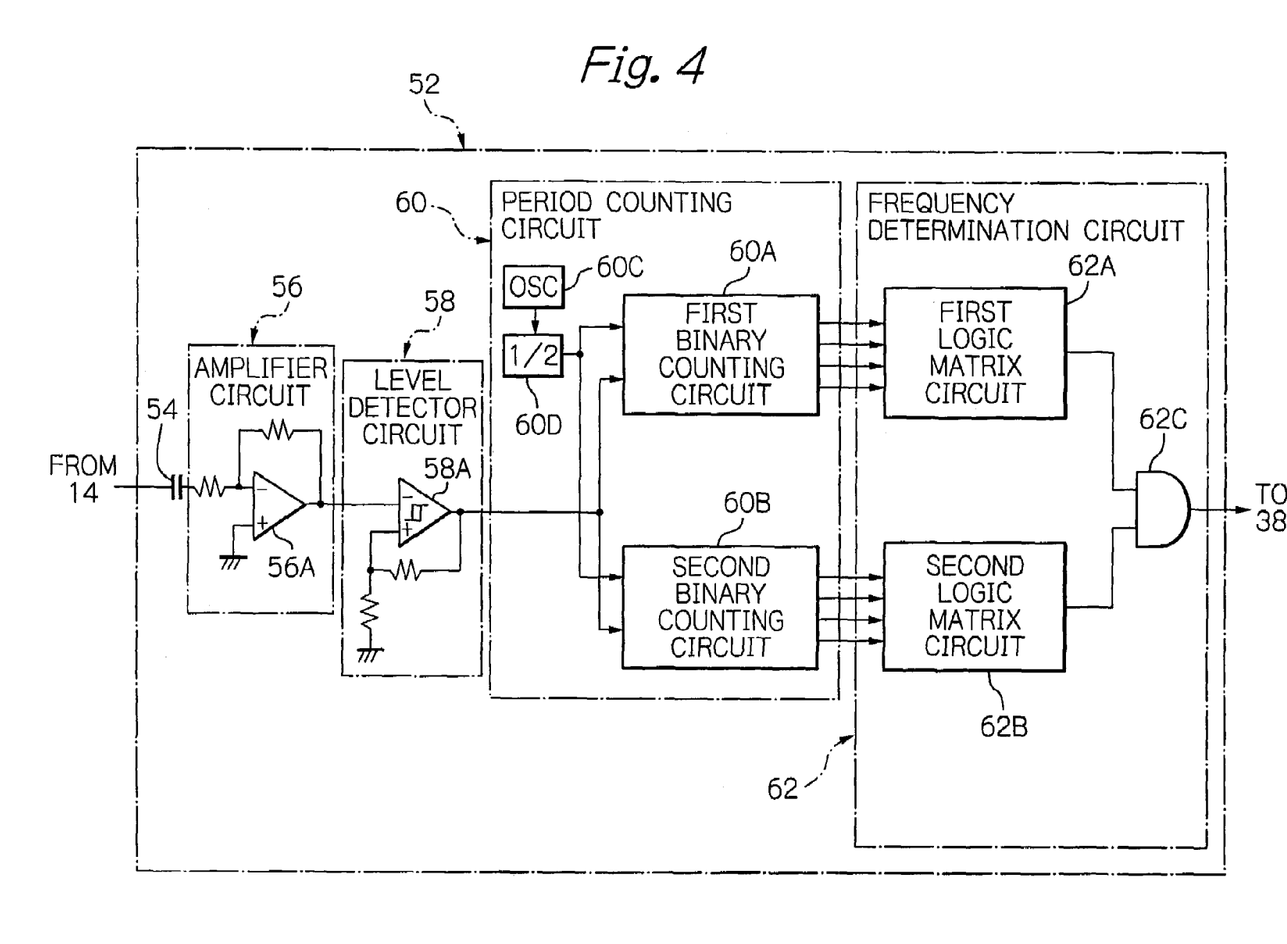
FIG. 4 is a circuit diagram of a detector circuit, used in a first embodiment of a broadcasting satellite converter according to the present invention, which is substituted for the prior art detector circuit shown in FIG. 1.

When this embodiment of the BS converter according to the present invention is illustrated in a block diagram, it is substantially identical to the block diagram shown in FIG. 1, except that a detector circuit, generally indicated by reference 52 in FIG. 4, is substituted for the detector circuit 36 shown in FIG. 2.

As shown in FIG. 4, the detector circuit 52 includes a capacitor 54, an amplifier circuit 56, a level detector circuit 58, a period counting circuit 60, and a frequency determination circuit 62.

The capacitor 54 prevents the inputting of the power supply voltage signal (13 volts or 18 volts) to the detector circuit 52. The amplifier circuit 56 includes an amplifier 56A, and resistors associated with the amplifier 56A. Namely, both the capacitor 54 and the amplifier circuit 56 form a high pass filter, so that a high frequency signal is allowed to be input to the level detector circuit 58.

Note, such a high frequency signal may be the band switching pulse signal (22±4 kHz) superimposed on the power supply voltage signal or a spike noise superimposed on the power supply voltage signal.

The level detector circuit 58 includes a comparator 58A featuring a hysteresis characteristic, and resistors associated with the comparator 58A. The level detector circuit 58 removes noises from the high frequency signal, and wave-shapes the high frequency signal output from the amplifier circuit 56. The wave-shaped high frequency signal is output from the level detector circuit 58 to the period counting circuit 60.

The period counting circuit 60 includes a first binary counting circuit 60A, a second binary counting circuit 60B, a free-running oscillator (OSC) 60A, and a one-half frequency divider 60B.

The wave-shaped high frequency signal is input to both the first and second binary counting circuits 60A and 60B. In this embodiment, the free-running oscillator 60C outputs a series of clock pulses having a frequency of 440 kHz to the one-half frequency divider 60B, in which the series of clock pulses having a frequency of 440 kHz is converted into a series of clock pulses having a frequency of 220 kHz. As shown in FIG. 4, the series of clock pulses having the frequency of 220 kHz is also input to both the first and second binary counting circuits 60A and 60B.

In the first binary counting circuit 60A, during a high level duration of the wave-shaped high frequency signal, a number of the clock pulses (220 kHz), input to the first binary counting circuit 60A, is counted, and the counted clock pulses are output as 4-bit data from the first binary counting circuit 60A, with the 4-bit data representing the high level duration of the wave-shaped high frequency signal.

On the other hand, in the second binary counting circuit 60B, during a low level duration of the wave-shaped high frequency signal, a number of the clock pulse (220 kHz), input to the second binary counting circuit 60B, is counted, and the counted clock pulses are output as 4-bit data from the first binary counting circuit 60B, with the 4-bit data representing the low level duration of the wave-shaped high frequency signal.

The frequency determination circuit 62 includes a first logic matrix circuit 62A, a second logic matrix circuit 62B, and an AND-gate 62C. Note, the first and second logic matrix circuit 62A and 62B are essentially identical to each other.

The first logic matrix circuit 62A determines whether the 4-bit data, output from the first binary counting circuit 60A, is derived from the band switching pulse signal (22±4 kHz). When it is determined by the first logic circuit 62A that the 4-bit data is derived from the band switching pulse signal, the first logic circuit 62A outputs a high level signal to the AND-gate 62C. When it is determined by the first logic circuit 62A that the 4-bit data is not derived from the band switching pulse signal, the first logic circuit 62A outputs a low level signal to the AND-gate 62C.

On the other hand, the second logic matrix circuit 62B determines whether the 4-bit data, output from the second binary counting circuit 60B, is derived from the band switching pulse signal (22±4 kHz). When it is determined by the second logic circuit 62B that the 4-bit data is derived from the band switching pulse signal, the second logic circuit 62B outputs a high level signal to the AND-gate 62C. When it is determined by the second logic circuit 62B that the 4-bit data is not derived from the band switching pulse signal, the second logic circuit 62B outputs a low level signal to the AND-gate 62C.

Figure 5:
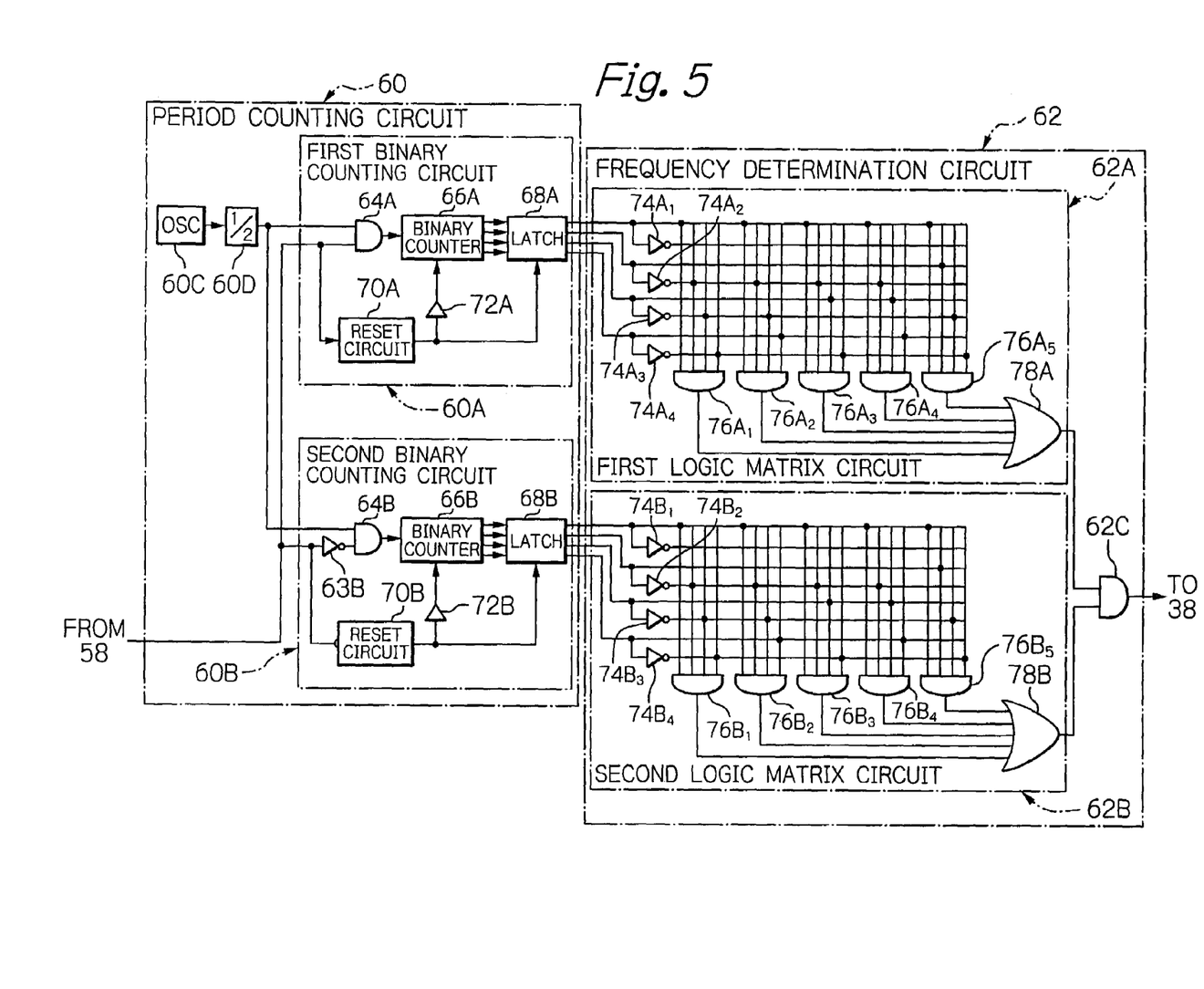
FIG. 5 is a circuit diagram of both a period counting circuit and a frequency determination circuit included in the detector circuit shown in FIG. 4.

FIG. 5 shows the period counting circuit 60 and the frequency determination circuit 62 in detail.

The first binary counting circuit 60A includes an AND-gate 64A, a binary counter 66A, a latch circuit 68A, a reset circuit 70A, and a buffer 72A, and these elements are arranged as shown in FIG. 5.

On the other hand, the second binary counting circuit 60B includes an inverter 63B, an AND-gate 64B, a binary counter 66B, a latch circuit 68B, a reset circuit 70B, and a buffer 72B, and these elements are arranged as shown in FIG. 5.

The first logic matrix circuit 62A includes four inverters 74A$_1$, 74A$_2$, 74A$_3$ and 74A$_4$, five AND-gates 76A$_1$, 76A$_2$, 76A$_3$, 76A$_4$ and 76A$_5$, and an OR-gate 78A, and these elements are arranged as shown in FIG. 5.

On the other hand, the first logic matrix circuit 62B includes four inverters 74B$_1$, 74B$_2$, 74B$_3$ and 74B$_4$, five AND-gates 76B$_1$, 76B$_2$, 76B$_3$, 76B$_4$ and 76B$_5$, and an OR-gate 78V, and these elements are arranged as shown in FIG. 5.

Next, with reference to a timing chart of FIG. 6, an operation of the detector circuit 52 will be now explained below.

For example, when the band switching pulse signal having the frequency of 22±4 kHz is superimposed on the power supply voltage signal (13 volts or 18 volts) in the BS tuner 14 by tuning the television set to a channel to receive a BS signal included in the high frequency band of 11.7 GHz to 12.75 GHz, the band switching pulse signal is input to the amplifier circuit 56 through the capacitor 54. Namely, the band switching pulse signal is amplified to a given voltage level by the amplifier 56A, and the amplified band switching pulse signal is input to the level detector circuit 58.

In the level detector circuit 58, the amplified band switching pulse signal is compared with a predetermined threshold voltage by the comparator 58A. Since the threshold voltage is previously set so as to be lower than a peak voltage of the amplified band switching pulse signal, a pulse signal, having substantially the same frequency as that (22±4 kHz) of the band switching pulse signal, is output from the level detector circuit 58.

Thus, although the pulse signal, which is output from the level detector circuit 58, may be referred to as a band switching pulse signal, this band switching pulse signal is free from the various noises involved in the original band switching pulse signal, due to the hysteresis characteristic of the comparator 58A. In short, the band switching pulse signal is wave-shaped by the comparator 58A, and the wave-shaped band switching pulse signal is output to both the first and second binary circuits 60A and 60B of the period counting circuit 60.

Note, the wave-shaped band switching pulse signal may have a duty factor of approximately 50%, because the original band switching pulse signal features a duty factor of 50%, as already stated hereinbefore. Namely, the wave-shaped band switching pulse features a high level duration and a low level duration which are equal to each other, as is apparent from the timing chart of FIG. 6.

Figure 6A:
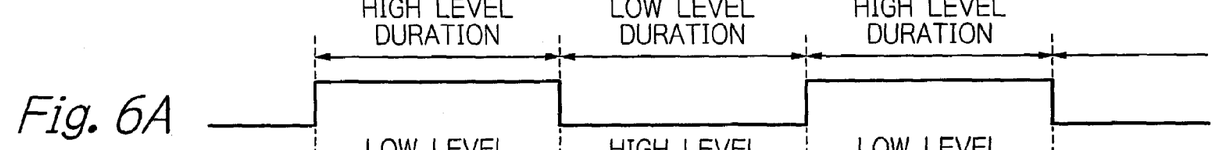
FIGS. 6A through 6H are timing diagrams to explain an operation of the detector circuit shown in FIG. 4, when a band switching pulse signal is superimposed on a power supply voltage signal.

In the first binary counting circuit 60A, the wave-shaped band switching pulse signal is input to one input terminal of the AND-gate 64A and an input terminal of the reset circuit 70A, as shown in a timing diagram of FIG. 6A.

On the other hand, in the second binary counting circuit 60B, the wave-shaped band switching pulse signal is input to one input terminal of the AND-gate 64B through the inverter 63B, and to an inverted input terminal of the reset circuit 70B. Namely, the wave-shaped band switching pulse is input as an inverted band switching pulse signal to both the AND-gate 64B and the reset circuit 70B, as shown in a timing diagram of FIG. 6B.

Figure 6B:
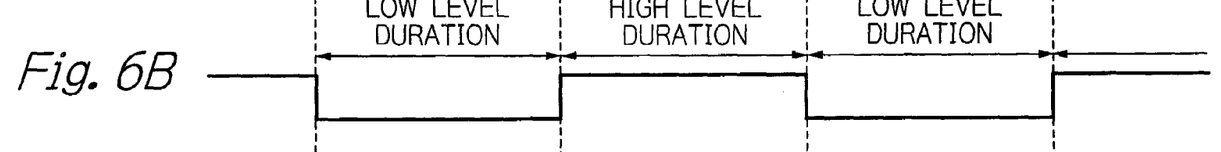
Figure 6C:
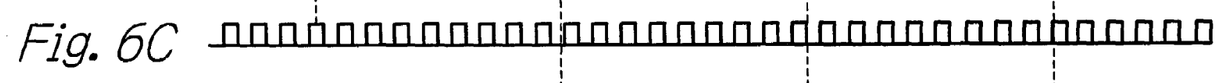

Further, the series of clock pulses (220 kHz) is input from the one-half frequency divider 60D to both the other input terminals of the AND gates 64A and 64B, as shown in a timing diagram of FIG. 6C.

In the first binary counting circuit 60A, during a high level duration of the wave-shaped band switching pulse signal (FIG. 6A), the clock pulses (220 kHz), which are output from the one-half frequency divider 60D, pass through the AND-gate 64A, and are input to the binary counter 66A. The binary counter 66A successively counts the clock pulses (220 kHz) passing through the AND-gate 64A, and a number of the counted clock pulses is output as 4-bit data from the binary counter 66A to the latch circuit 68A.

Note, while the first binary counting circuit 60A is subjected to a high level duration of the wave-shaped band switching pulse signal (FIG. 6A), the second binary counting circuit 60B is subjected to a low level duration of the inverted band switching pulse signal (FIG. 6B), so that the clock pulses (220 kHz), which are output from the one-half frequency divider 60D, cannot pass through the AND-gate 64B.

Figure 6D:
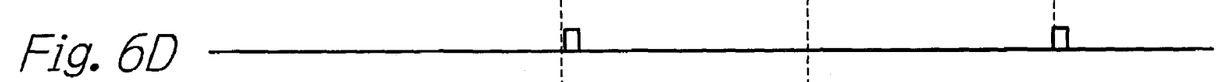

The reset circuit 70A is constituted so as to output a reset signal at an end of the high level duration of the wave-shaped band switching pulse signal, i.e. at a falling edge of the pulse of the wave-shaped band switching pulse signal, as shown in a timing diagram of FIG. 6D.

The reset signal (FIG. 6D) is output from the reset circuit 70A to the binary counter 66A through the buffer 72A, to thereby reset the binary counter 66A. Also, the reset signal (FIG. 6D) is output as a latch timing signal to the latch circuit 68A, so that the 4-bit data is latched in the latch circuit 68A. Thus, the latched 4-bit data representing the high level duration of the wave-shaped band switching pulse signal is output to the second logic matrix circuit 62A of the frequency determination circuit 62.

In short, in the first binary counting circuit 60A, the counting of the clock pulses (220 kHz) is started at a beginning of a high level duration of the wave-shaped band switching pulse signal, i.e. at a rising edge of a pulse of the wave-shaped band switching pulse signal, and is stopped at an end of the high level duration of the wave-shaped band switching pulse signal, i.e. at a falling edge of the high level duration of the wave-shaped band switching pulse signal.

After the latch timing signal is output from the reset circuit 70A, the second binary counting circuit 60B is subjected to the high level duration of the inverted band switching pulse signal (FIG. 6B). Thus, the clock pulses (220 kHz), which are output from the one-half frequency divider 60D, pass through the AND-gate 64B, and are input to the binary counter 66B. The binary counter 66B successively counts the clock pulses (220 kHz) passing through the AND-gate 64B, and a number of the counted clock pulses is output as 4-bit data from the binary counter 66B to the latch circuit 68B.

Figure 6E:
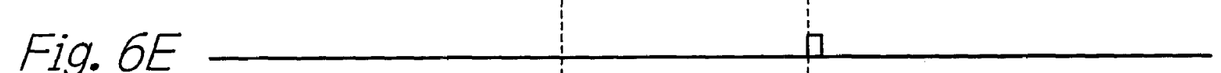

Similar to the reset circuit 70A, the reset circuit 70B is constituted so as to output a reset signal at an end of the high level duration of the inverted band switching pulse signal, i.e. at a falling edge of the pulse of the wave-shaped band switching pulse signal, as shown in a timing diagram of FIG. 6E.

The reset signal (FIG. 6E) is output from the reset circuit 70B to the binary counter 66B through the buffer 72B, to thereby reset the binary counter 66B. Also, the reset signal (FIG. 6E) is output as a latch timing signal to the latch circuit 68B, so that the 4-bit data is latched in the latch circuit 68B. Thus, the latched 4-bit data, which represents the high level duration of the inverted band switching pulse signal (FIG. 6B), i.e. the low level duration of the wave-shaped band switching pulse signal (FIG. 6A), is output to the second logic matrix circuit 62B of the frequency determination circuit 62.

In short, in the second binary counting circuit 60B, the counting of the clock pulses (220 kHz) is started at a beginning of a high level duration of the inverted band switching pulse signal, i.e. at a rising edge of a pulse of the inverted band switching pulse signal, and is stopped at an end of the high level duration of the inverted band switching pulse signal, i.e. at a falling edge of the high level duration of the inverted band switching pulse signal.

Since the clock pulses (220 kHz), which are output from the one-half frequency divider 60D, have a frequency which is approximately ten times that of the wave-shaped band switching pulse signal (FIG. 6A) having the frequency of 22±4 kHz, the number of clock pulses (220 kHz), which is counted by the binary counter 66A during the high and low level duration of the wave-shaped band switching pulse signal, may be 10±2. Similarly, the number of clock pulses (220 kHz), which is counted by the binary counter 66B during the low and low level duration of the wave-shaped band switching pulse signal, may be 10±2. In short, when the band switching pulse signal (22±4 kHz) is superimposed on the power supply voltage signal (13 volts or 18 volts), the 4-bit data, which are output from each of the latch circuits 68A and 68B, may have any one of five 4-bit data [1000], [1001], [1010], [1011] and [1100].

In the frequency determination circuit 62, each of the first and second logic matrix circuits 62A and 62B is constituted such that each of the 4-bit data [1000], [1001], [1010], [1011] and [1100] is converted into 4-bit data [1111].

In particular, for example, when the 4-bit data [1000] is input from the latch circuit 68A to the first logic matrix circuit 62A, the 4-bit data [1000] is converted into 4-bit data [1111] due to the existence of the inverters $74A_2$, $74A_3$ and $74A_4$, and then the 4-bit data [1111] is input to the AND-gate $76A_1$, so that a high level signal is output from the AND-gate $76A_1$ to the OR-gate 78A.

Also, for example, when the 4-bit data [1010] is input from the latch circuit 68A to the first logic matrix circuit 62A, the 4-bit data [1010] is converted into 4-bit data [1111] due to the existence of the inverters $74A_2$ and $74A_4$, and then the 4-bit data [1111] is input to the AND-gate $76A_3$, so that a high level signal is output from the AND-gate $76A_3$ to the OR-gate 78A.

Similarly, for example, when the 4-bit data [1001] is input from the latch circuit 68B to the second logic matrix circuit 62B, the 4-bit data [1001] is converted into 4-bit data [1111] due to the existence of the inverters $74B_2$ and $74B_3$, and then the 4-bit data [1111] is input to the AND-gate $76B_2$, so that a high level signal is output from the AND-gate $76B_2$ to the OR-gate 78B.

Further, for example, when the 4-bit data [1100] is input from the latch circuit 68B to the second logic matrix circuit 62B, the 4-bit data [1100] is converted into 4-bit data [1111] due to the existence of the inverters $74B_3$ and $74B_4$, and then the 4-bit data [1111] is input to the AND-gate $76B_5$, so that a high level signal is output from the AND-gate $76B_5$ to the OR-gate 78B.

Figure 6F:
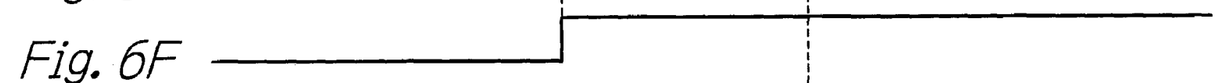

Thus, when the band switching pulse signal (22±4 kHz) is superimposed on the power supply voltage signal (13 volts or 18 volts), a high level signal is output from any one of the AND-gates $76A_1$, $76A_2$, $76A_3$, $76A_4$ and $76A_5$ to the OR-gate 78A, so that a high level signal is output from the OR-gate 78A to the AND-gate 62C, as shown in a timing diagram of FIG. 6F.

Figure 6G:
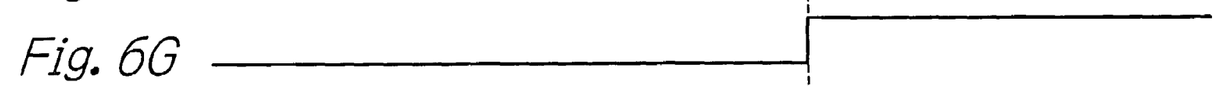

Similarly, when the band switching pulse signal (22±4 kHz) is superimposed on the power supply voltage signal (13 volts or 18 volts), a high level signal is output from any one of the AND-gates $76B_1$, $76B_2$, $76B_3$, $76B_4$ and $76B_5$ to the OR-gate 78B, so that a high level signal is output from the OR-gate 78B to the AND-gate 62C, as shown in a timing diagram of FIG. 6G.

Figure 6H:
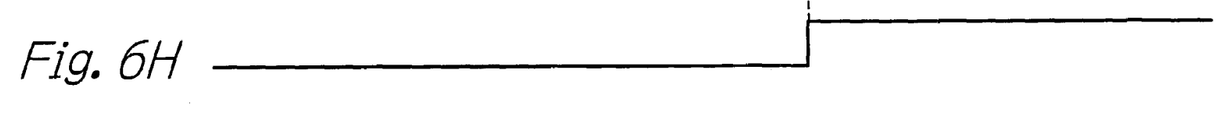

Accordingly, when the respective high level signals are input from the OR-gates 78A and 78B to the AND-gate 62C, a high level signal is output from the AND-gate 62C to the selector circuit 38, as shown in a timing diagram of FIG. 6H.

Therefore, similar to the above-mentioned prior art BS converter shown in FIG. 1, when the television set, connected to the BS tuner 14, is tuned to a channel to receive a BS signal included in the high frequency band of 11.7 GHz to 12.75 GHz, i.e. when the band switching pulse signal is superimposed on the power supply voltage signal (13 volts or 18 volts) in the BS tuner 14, the first drive control signal, which is output from the selector circuit 38 to the first local frequency oscillator 32L, is changed from the high level to the low level so that the driving of the first local frequency oscillator 32L is stopped. On the other hand, the second drive control signal, which is output from the selector circuit 38 to the second local frequency oscillator 32H, is changed from the low level to a high level so that the second local frequency oscillator 32H is driven.

In short, while the band switching pulse signal (22±4 kHz) is superimposed on the power supply voltage signal (13 volts or 18 volts), only the second local frequency oscillator 32H is driven so that the BS signals, included in the high frequency band of 11.7 GHz to 12.75 GHz, are converted into the intermediate frequency signals BS-IF.

While the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a low frequency spike noise having a lower frequency than that (22±4 kHz) of the band switching pulse signal may be superimposed on the power supply voltage signal.

In this case, the 4-bit data, which is output from at least one of the latch circuits 68A and 68B, has a larger value than the 4-bit data [1100], and thus the high level signal cannot be output from the AND-gate 62C to the selector circuit 38. Namely, although the low frequency spike noise having the lower frequency than that (22±4 kHz) of the band switching pulse signal is superimposed on the power supply voltage signal (13 volts or 18 volts), the detector circuit 52 does not recognize the low frequency spike noise as the band switching signal.

Also, while the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a high frequency spike noise having a higher frequency than that (22±4 kHz) of the band switching pulse signal may be superimposed on the power supply voltage signal.

In this case, the 4-bit data, which is output from at least one of the latch circuits 68A and 68B, has a smaller value than the 4-bit data [1000], and thus the high level signal cannot be output from the AND-gate 62C to the selector circuit 38. Namely, although the high frequency spike noise having the higher frequency than that (22±4 kHz) of the band switching pulse signal is superimposed on the power supply voltage signal (13 volts or 18 volts), the detector circuit 52 does not recognize the high frequency spike noise as the band switching signal.

Figures 7A, 7B:
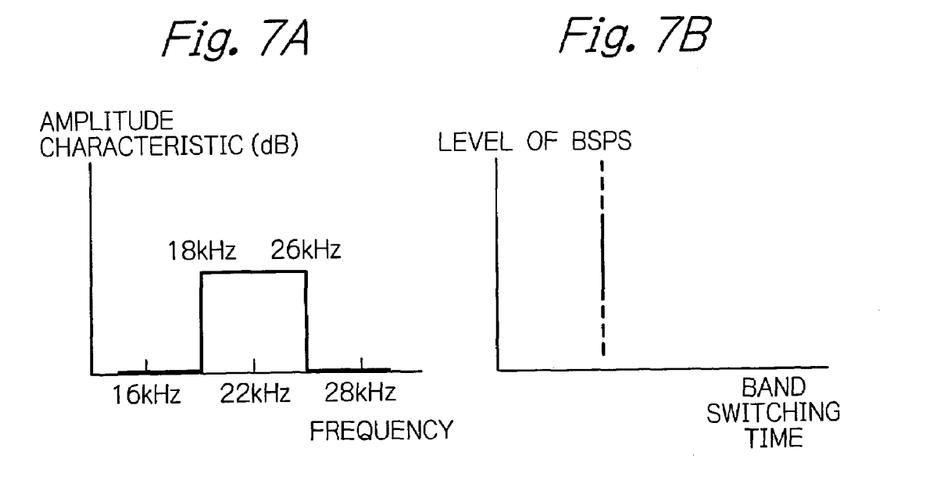
FIG. 7A is a graph showing a frequency/amplitude characteristic of the detector circuit shown in FIG. 4.
FIG. 7B is a graph showing a band switching time characteristic of the detector circuit shown in FIG. 4.

In this first embodiment, the detector circuit 52 may have a frequency/amplitude characteristic as shown in a graph of FIG. 7A. As shown in this graph, the frequency/amplitude characteristic features a rectangular profile, the sides of which are defined by the frequencies of 18 kHz and 26 kHz, and thus the detector circuit 52 is not susceptible to various noises, resulting in a satisfactorily reliable operation of the BS converter according to the present invention.

Also, according to the present invention, whenever the band switching pulse signal (22±4 kHz) is superimposed on the power supply voltage signal (13 volts or 18 volts), it is possible to securely detect the superimposition of the band switching pulse signal on the power supply voltage signal, and thus a sensitivity of the detector circuit 52 for detecting the band switching pulse signal is superior to the case of the above-mentioned prior art BS converter.

Also, according to the present invention, as shown in a graph of FIG. 7B, the detector circuit 52 may have a band switching time characteristic with respect to a level of the wave-shaped band switching pulse signal (BSPS) output from the level detector circuit 58. As already stated, the band switching time is defined as a period of time measured from a time at which the television set is tuned to a channel to receive a BS signal included in the high frequency band to a time at which a picture is displayed on a screen of the television set based on the tuned channel. As is apparent from the graph of FIG. 7B, the band switching time may be substantially zero, because the frequency (22±4 kHz) of the band switching pulse signal, superimposed on the power supply voltage signal, is directly detected by the detector circuit 52 without utilizing the level of the wave-shaped band switching pulse signal. Thus, according to the present invention, as soon as the television set is tuned to a channel to receive a BS signal included in the high frequency band, it is possible to display a picture on a screen of the television set based on the tuned channel.

Second Embodiment

Next, with reference to FIG. 8, a second embodiment of the broadcasting satellite (BS) converter according to the present invention is explained below.

In the second embodiment, another frequency determination circuit 80 is substituted for the frequency determination circuit 62 shown in FIG. 5.

Figure 8:
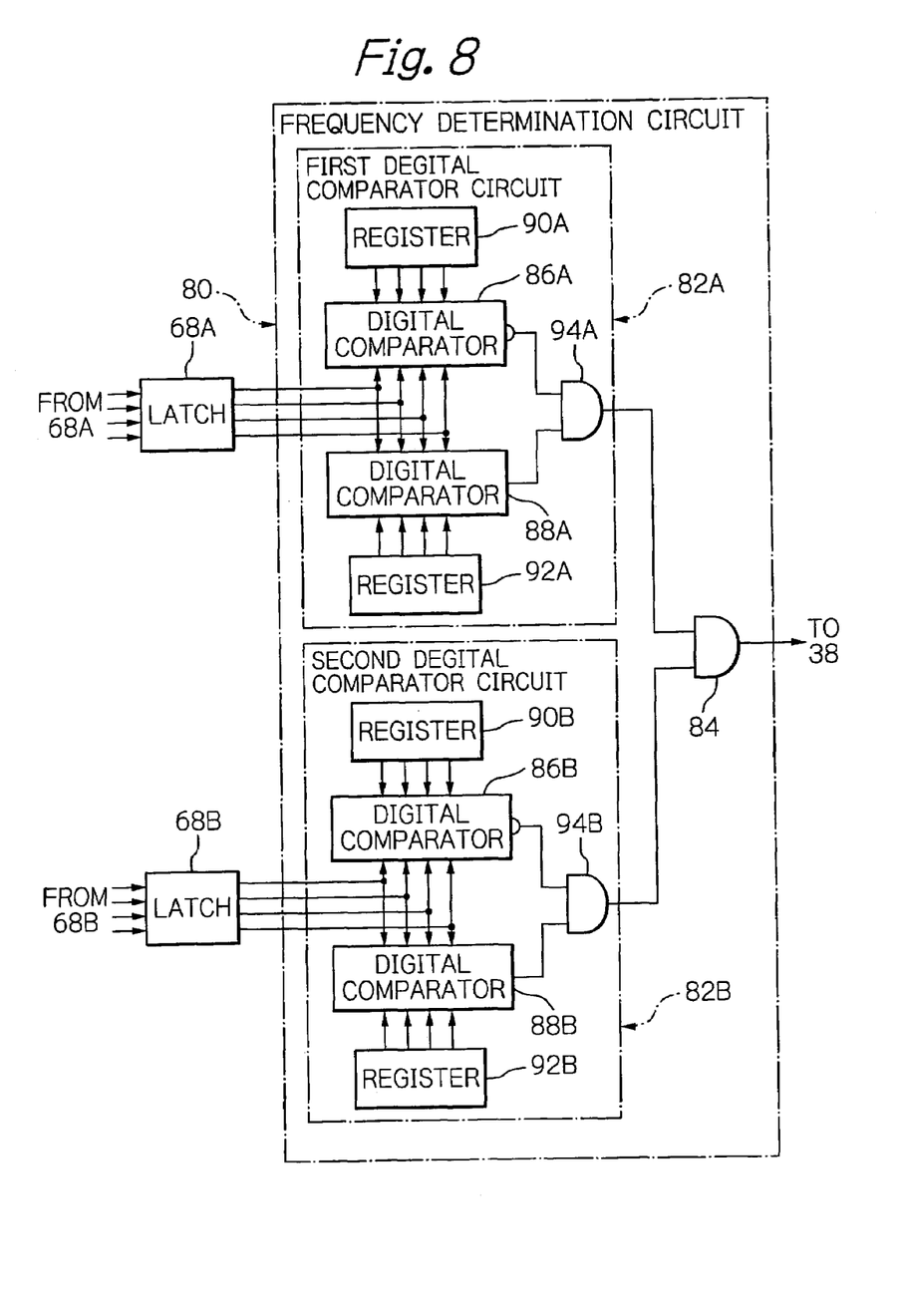
FIG. 8 is a circuit diagram of a frequency determination circuit which is included in a detector circuit used in a first embodiment of the broadcasting satellite converter according to the present invention.

As shown in FIG. 8, the frequency determination circuit 80 includes a first window-type digital comparator circuit 82A, a second window-type digital comparator circuit 82B, and an AND-gate 84.

The first window-type digital comparator circuit 82A includes a pair of digital comparators 86A and 88A, a pair of registers 90A and 92A, and an AND-gate 94A, and these elements are arranged as shown in FIG. 8. Similarly, the second window-type digital comparator circuit 82B includes a pair of digital comparators 86B and 88B, a pair of registers 90B and 92B, and an AND-gate 94B, and these elements are arranged as shown in FIG. 8. Note, the first and second window type digital comparator circuits 82A and 82B are identical to each other.

In the first window-type digital comparator circuit 82A, the digital comparators 86A and 88A are connected to the latch circuit 68A of the first binary counting circuit 60A so as to receive 4-bit data output from the latch circuit 68A. Also, a high 4-bit threshold data [1101] is set in the resistor 90A, and a low 4-bit threshold data [1000] is set in the resistor 92A. Note, in this second embodiment, the BS converter (10) includes a system controller (not shown), by which the respective settings of the 4-bit data [1101] and [1000] in the resistors 90A and 92A are carried out.

When 4-bit data is input from the latch circuit 68A to both the digital comparators 86A and 88A, it is compared with the high 4-bit threshold data [1101] and low 4-bit threshold data [1000] by the respective digital comparators 86A and 88A.

In particular, when the 4-bit data output from the latch circuit 68A is equal to or larger than the high 4-bit threshold data [1101] set in the resistor 90A, the digital comparator 86A outputs a low level signal to the AND-gate 94A. When the 4-bit data is smaller than the high 4-bit threshold data [1101], the digital comparator 86A outputs a high level signal to the AND-gate 94A. On the other hand, when the 4-bit data output from the latch circuit 68A is equal to or larger than the low 4-bit threshold data [1000] set in the resistor 92A, the digital comparator 88A outputs a high level signal to the AND-gate 94A. When the 4-bit data is smaller than the low 4-bit threshold data [1000], the digital comparator 86A outputs a low level signal to the AND-gate 94A.

In short, only when the 4-bit data output from the latch circuit 68A falls within the range from the 4-bit data [1000] to [1100], i.e. only when the 4-bit data represents a high level duration of the wave-shaped band switching pulse signal (22±4 kHz), do the respective digital comparators 86A and 88A output the high level signals to the AND-gate 94A, and then this AND-gate 94A outputs a high level signal to the AND-gate 84.

In the second window-type digital comparator circuit 82B, the digital comparators 86B and 88B are connected to the latch circuit 68B of the second binary counting circuit 60B so as to receive 4-bit data output from the latch circuit 68B. Also, a high 4-bit threshold data [1101] is set in the resistor 90B, and a low 4-bit threshold data [1000] is set in the resistor 92B. Note, the respective settings of the 4-bit data [1101] and [1000] in the resistors 90B and 92B are carried out by the aforesaid system controller (not shown).

When 4-bit data is input from the latch circuit 68B to both the digital comparators 86B and 88B, it is compared with the high 4-bit threshold data [1101] and low 4-bit threshold data [1000] by the respective digital comparators 86B and 88B.

In particular, when the 4-bit data output from the latch circuit 68B is equal to or larger than the high 4-bit threshold data [1101] set in the resistor 90B, the digital comparator 86B outputs a low level signal to the AND-gate 94B. When the 4-bit data is smaller than the high 4-bit threshold data [1101], the digital comparator 86B outputs a high level signal to the AND-gate 94B. On the other hand, when the 4-bit data output from the latch circuit 68B is equal to or larger than the low 4-bit threshold data [1000] set in the resistor 92B, the digital comparator 88B outputs a high level signal to the AND-gate 94B. When the 4-bit data is smaller than the low 4-bit threshold data [1000], the digital comparator 86B outputs a low level signal to the AND-gate 94B.

In short, only when the 4-bit data output from the latch circuit 68B falls within the range from the 4-bit data [1000] to [1100], i.e. only when the 4-bit data represents a low level duration of the wave-shaped band switching pulse signal (22±4 kHz), do the respective digital comparators 86B and 88B output the high level signals to the AND-gate 94B, and then this AND-gate 94B outputs a high level signal to the AND-gate 84.

When the respective AND-gate 94A and 94B output the high level signals to the AND-gate 84, i.e. when it is confirmed that the band switching pulse signal (22±4 kHz) is superimposed on the power supply voltage signal (13 volts or 18 volts), the AND-gate 84 outputs a high voltage signal to the selector circuit 38. Thus, similar to the above-mentioned first embodiment, it is possible to properly control the operations of the first and second local frequency oscillators 32L and 32H.

In the above-mentioned embodiments of the present invention, although the band switching pulse signal (22±4 kHz) is superimposed on the power supply voltage signal (13 volts or 18 volts), no influence can be exerted on the intermediate frequency signals BS-IF by the superimposed band switching pulse signal, because the frequency of the band switching pulse signal is sufficiently lower than that (950 to 2150 MHz) of the intermediate frequency signal BS-IF.

Finally, it will be understood by those skilled in the art that the foregoing description is of a preferred embodiment of the device, and that various changes and modifications may be made to the present invention without departing from the spirit and scope thereof.

The invention claimed is:

1. A broadcasting satellite converter adapted to be connected to a broadcasting satellite tuner and fed with a pulse signal from said broadcasting satellite tuner, which converter comprises:
   a receiver circuit including a mixer, and a plurality of local oscillators connected to said mixer to convert broadcasting satellite signals into intermediate frequency signals; and
   a control circuit that controls said receiver circuit, wherein said control circuit includes:
   a detector circuit that detects whether a band switching pulse signal is superimposed on said pulse signal, said detector circuit including a period counting circuit that produces numerical count data representing a period of a frequency of said band switching pulse signal; and
   a selector circuit that selectively drives one of said local oscillators in accordance with the numerical count data obtained in said detector circuit.

2. A control circuit that controls a plurality of local oscillators, included in a receiver circuit of a broadcasting satellite converter, with a band switching pulse signal superimposed on a pulse signal fed from a broadcasting satellite tuner to said receiver circuit, which control circuit comprises:
   a detector circuit that detects whether the band switching pulse signal is superimposed on said pulse signal, said detector circuit including a period counting circuit that produces numerical count data representing a period of a frequency of said band switching pulse signal; and
   a selector circuit that selectively drives one of said local oscillators in accordance with the numerical count data obtained in said detector circuit.

3. The control circuit as set forth in claim 2, wherein said period counting circuit includes:
   an oscillator that outputs a series of clock pulses having a higher frequency than that of said band switching pulse signal; and
   a counter that counts the clock pulses output from said oscillator during the period of the frequency of said band switching pulse signal for the production of said numerical count data.

4. The control circuit as set forth in claim 3, wherein said period counting circuit further includes a reset circuit that resets said counter when the counting of the clock pulses during the period of the frequency of said band switching pulse signal is completed.

5. The control circuit as set forth in claim 2, wherein said period counting circuit includes:
   an oscillator that outputs a series of clock pulses having a higher frequency than that of said band switching pulse signal;
   a first counter that counts the clock pulses output from said oscillator during a first level duration of said band switching pulse signal to thereby produce a first piece of numerical count data representing the first level duration of said band switching pulse signal; and
   a second counter that counts the clock pulses output from said oscillator during a second level duration of said band switching pulse signal to thereby produce a second piece of numerical count data representing the second level duration of said band switching pulse signal, with the first and second pieces of numerical count data forming said numerical count data.

6. The control circuit as set forth in claim 5, wherein said period counting circuit further includes:

a first reset circuit that resets said first counter when the counting of the clock pulses during the first level duration of said band switching pulse signal is completed; and a second reset circuit that resets said second counter when the counting of the clock pulses during the second level duration of said band switching pulse signal is completed.

7. The control circuit as set forth in claim 2, wherein said detector circuit further includes:

a high pass filter that is constituted such that said band switching pulse signal is allowed to pass therethrough; and a level detector circuit that detects a peak voltage of said band switching pulse signal so as to wave-shape the band switching pulse signal, the production of said numerical count data being carried out based on said wave-shaped band switching pulse signal.

8. The control circuit as set forth in claim 7, wherein said level detector circuit includes a comparator featuring a hysteresis characteristic for the wave-shaping of the band switching pulse signal.

9. The control circuit as set forth in claim 2, wherein said detector circuit further includes a frequency determination circuit that determines whether said numerical count data is derived from the frequency of said band switching pulse signal.

10. The control circuit as set forth in claim 9, wherein said frequency determination circuit is formed in a form of a logic matrix circuit.

11. The control circuit as set forth in claim 9, wherein said frequency determination circuit is formed in a form of a window-type digital comparator circuit.

12. A detector circuit that detects whether a band switching pulse signal is superimposed on a pulse signal fed from a broadcasting satellite tuner to a receiver circuit of a broadcasting satellite converter, which detector circuit comprises a period counting circuit that produces numerical count data representing a period of a frequency of said band switching pulse signal.

13. The detector circuit as set forth in claim 12, wherein said period counting circuit includes:

an oscillator that outputs a series of clock pulses having a higher frequency than that of said band switching pulse signal; and a counter that counts the clock pulses output from said oscillator during the period of the frequency of said band switching pulse signal for the production of said numerical count data.

14. The detector circuit as set forth in claim 13, wherein said period counting circuit further includes a reset circuit that resets said counter when the counting of the clock pulses during the period of the frequency of said band switching pulse signal is completed.

15. The detector circuit as set forth in claim 12, wherein said period counting circuit includes:

an oscillator that outputs a series of clock pulses having a higher frequency than that of said band switching pulse signal;

a first counter that counts the clock pulses output from said oscillator during a first level duration of said band switching pulse signal to thereby produce a first piece of numerical count data representing the first level duration of said band switching pulse signal; and a second counter that counts the clock pulses output from said oscillator during a second level duration of said band switching pulse signal to thereby produce a second piece of numerical count data representing the second level duration of said band switching pulse signal, with the first and second pieces of numerical count data forming said numerical count data.

16. The detector circuit as set forth in claim 15, wherein said period counting circuit further includes:

a first reset circuit that resets said first counter when the counting of the clock pulses during the first level duration of said band switching pulse signal is completed; and a second reset circuit that resets said second counter when the counting of the clock pulses during the second level duration of said band switching pulse signal is completed.

17. The detector circuit as set forth in claim 12, further comprising:

a high pass filter that is constituted such that said band switching pulse signal is allowed to pass therethrough; and a level detector circuit that detects a peak voltage of said band switching pulse signal so as to wave-shape the band switching pulse signal, the production of said numerical count data being carried out based on said wave-shaped band switching pulse signal.

18. The detector circuit as set forth in claim 17, wherein said level detector circuit includes a comparator featuring a hysteresis characteristic for the wave-shaping of the band switching pulse signal.

19. The detector circuit as set forth in claim 12, further comprising a frequency determination circuit that determines whether said numerical count data is derived from the frequency of said band switching pulse signal.

20. The detector circuit as set forth in claim 19, wherein said frequency determination circuit is formed in a form of a logic matrix circuit.

21. The detector circuit as set forth in claim 19, wherein said frequency determination circuit is formed in a form of a window-type digital comparator circuit.

* * * * *